United States Patent [19]

Hattori

[11] 4,329,623
[45] May 11, 1982

[54] ELECTRONIC FLASH APPARATUS

[75] Inventor: Shinichiro Hattori, Tokyo, Japan

[73] Assignee: Olympus Optical Co., Ltd., Tokyo, Japan

[21] Appl. No.: 134,423

[22] Filed: Mar. 27, 1980

[30] Foreign Application Priority Data

Apr. 6, 1979 [JP] Japan .................................. 54-41602

[51] Int. Cl.³ .......................................... H05B 41/32
[52] U.S. Cl. .................................. 315/151; 315/241 P
[58] Field of Search ................... 315/151, 159, 241 P; 354/33, 145

[56] References Cited

U.S. PATENT DOCUMENTS

| | | | |
|---|---|---|---|
| 3,200,723 | 8/1965 | Topaz | 354/34 |
| 3,875,471 | 4/1975 | Buck | 315/151 |
| 3,896,337 | 7/1975 | Decker | 315/151 X |
| 4,047,187 | 9/1977 | Mashimo et al. | 354/23 D |

FOREIGN PATENT DOCUMENTS 2143076 2/1973 France .
1374248 11/1974 United Kingdom .

Primary Examiner—Eugene R. La Roche
Attorney, Agent, or Firm—Frishauf, Holtz, Goodman & Woodward

[57] ABSTRACT

An electronic flash apparatus comprises a flash lamp and a semiconductor switching element which are connected in series across a main capacitor, and a flash control circuit which measures light reflected from an object to be photographed illuminated by flash light produced by the flash lamp, and produces a control signal to render the semiconductor switching element nonconductive. The flash control circuit includes a photoelectric converting circuit for converting the reflected light into a voltage signal, an integrator for integrating the voltage signal, and a comparator for comparing the output voltage from the integrator with a reference voltage. To obtain a proper flash exposure a compensation signal generating circuit is provided which is responsive to the initiation of flashing of the flash lamp to produce a compensation signal having a desired waveshape. The compensation signal acts on the flash control circuit to control the generation timing of the control signal. The flash light produced by the flash lamp after the switching element has been rendered nonconductive is positively used for a proper exposure.

6 Claims, 12 Drawing Figures

ELECTRONIC FLASH APPARATUS

BACKGROUND OF THE INVENTION

The present invention relates to an electronic flash apparatus and, more particularly to an exposure control system for a series control type electronic flash apparatus in which a flash discharge lamp and a semiconductor switching element are connected in series.

In FIG. 1, there is shown a conventional series control type flash apparatus. As shown, a main capacitor 2 is connected in parallel with a power source 1, and a series circuit of a silicon controlled rectifier element (thyristor) 4 and a flash discharge lamp 3 is connected in parallel with the main capacitor 2. To the trigger electrode of the flash discharge lamp 3 is connected a flash discharge lamp trigger circuit 5, and to the gate electrode of the thyristor 4 is connected a thyristor trigger circuit 6.

In operation, when a trigger switch 7 (synchro contact), interlocking with a shutter release button of an associated camera, is closed, a trigger signal generaing circuit 8 produces a flash initiation trigger signal and applies it to the trigger circuits 5 and 6. Then, the flash discharge tube 3 is triggered and the thyristor 4 is rendered conductive, so that the main capacitor 2 discharges through the series circuit of the lamp 3 and the thyristor 4 to cause the lamp 3 to produce flash light.

The flash light from the lamp 3 illuminates an object to be photographed and the reflected light from the object is sensed by a photosensitive element 9 where the light is converted into current. The current is further converted into voltage by a current-to-voltage converting circuit 10. The voltage is amplified by an amplifier 11. The output voltage from the amplifier 11 is applied to an integrator 13 through a film sensitivity selection circuit 12. The circuit 12 is used for setting an integration time constant of the integrator 13 to a value corresponding to the sensitivity of a film used. The integrator circuit 13 is so designed as to initiate the integration from the initial value in response to the trigger signal.

The output voltage from the integration circuit 13 is applied to one of the input terminals of comparator 14 where it is compared with a reference voltage Vref applied to the other input terminal of the comparator. When the output voltage from the integrator circuit 13 exceeds the reference voltage Vref, that is, when the amount of the reflected light from the object reaches a given level, the comparator 14 produces a flash terminating signal. The flash terminating signal is applied to a quenching tube trigger circuit 17 connected to the trigger electrode of a quenching tube 16 which is connected through a commutating capacitor 15a to connection point between the flash discharge tube 3 and the thyristor 4. Resistors 18 and 19 connect the positive and negative electrodes of the commutating capacitor 15 to the positive terminal and the negative terminal of the power source 1, respectively, whereby a charging path for the commutating capacitor 15 is formed.

The quenching tube 16 is rendered conductive by the flash terminating signal, so that the thyristor 4 is reverse biased by the voltage across the commutating capacitor 15 to be rendered nonconductive.

The flash apparatus as above mentioned presents the following problems. At the time when the thyristor 4 is rendered nonconductive, the impedance of the discharge tube 3 is very low and a relatively large amount of charge is left in the main capacitor 2 and the capacitor 15. Accordingly, discharge current flows through a closed loop formed by the main capacitor 2, the discharge tube 3, the commutating capacitor 15 and the quenching tube 16. As a result, the flash discharge lamp 3 is caused to produce flash light even after the thyristor has been rendered nonconductive, that is, even at the time in which the lamp 3 should not produce flash light. For this reason, it is very difficult to obtain a proper exposure. FIG. 2 illustrates this state. As seen from FIG. 2, a relatively large amount of flash light is produced, as indicated by the hatched portion, even after the flash terminate signal is produced and thus the thyristor 4 is rendered nonconductive at time $t_1$.

The amount of light of the hatched portion causes an excessive exposure. The earlier the time $t_1$, that is, the closer the photographing distance, the more distinguished becomes the degree of the excessive exposure. The reason why a peak value of the intensity of the flash light is present immediately after the time $t_1$ is that the sum of charges of the main capacitor 2 and the commutating capacitor 3 is applied to the lamp 3 after the thyristor 4 is rendered nonconductive.

In Japanese published patent specification Nos. 49408/'76 and 49410/'76, to prevent the exposure error caused by the flash light after the thyristor is rendered nonconductive, a by-pass capacitor is connected in parallel with a flash lamp to by-pass discharge current after the thyristor is rendered nonconductive. This approach, however, uselessly consumes the charge stored in the main capacitor. This makes it difficult to conduct successive and quick flash photographing. Further, the voltage of a battery used as a power source is remarkably reduced.

Accordingly, an object of the invention is to provide an improved electronic flash apparatus of series control type which removes the abovementioned drawbacks of the conventional flash apparatus and includes means for obtaining a desired flash exposure.

SUMMARY OF THE INVENTION

According to this invention, there is provided a compensation signal generating means for generating a compensation signal having a desired waveshape in response to application of a trigger signal (flash initiation signal) thereto. The compensation signal acts on a control circuit means adapted to measure amount of light reflected from an object to be photographed to produce a control signal for rendering a switching element connected in series with a flash discharge lamp and including a photoelectric converting means for converting light reflected from the object into a voltage signal, an integraton circuit for integrating the voltage signal, and a comparing circuit means for comparing the output voltage from the integration circuit with a reference voltage, so as to control the timing of generation of the control signal.

For obtaining the correct exposure, the control circuit means responds to the compensation signal to produce the control signal earlier than when it receives no compensation signal. Namely, invention positively takes advantage of an amount of the flash light after the control signal is produced in addition to that before the control signal is produced.

In the illustrated embodiments, the compensation signal is applied to an analog multiplier where it is multiplied by an input signal or an output signal from the integrator. In another embodiment, the compensation signal is used for changing an integration time constant of the integrator in accordance with the waveshape of the compensation signal. In a still another embodiment the reference voltage of the comparator is changed in accordance with the waveshape of the compensation signal.

Other objects and features of the invention will be apparent from the following description taken in connection with the accompanying drawings.

DETAILED DESCRIPTION

Figure 1:
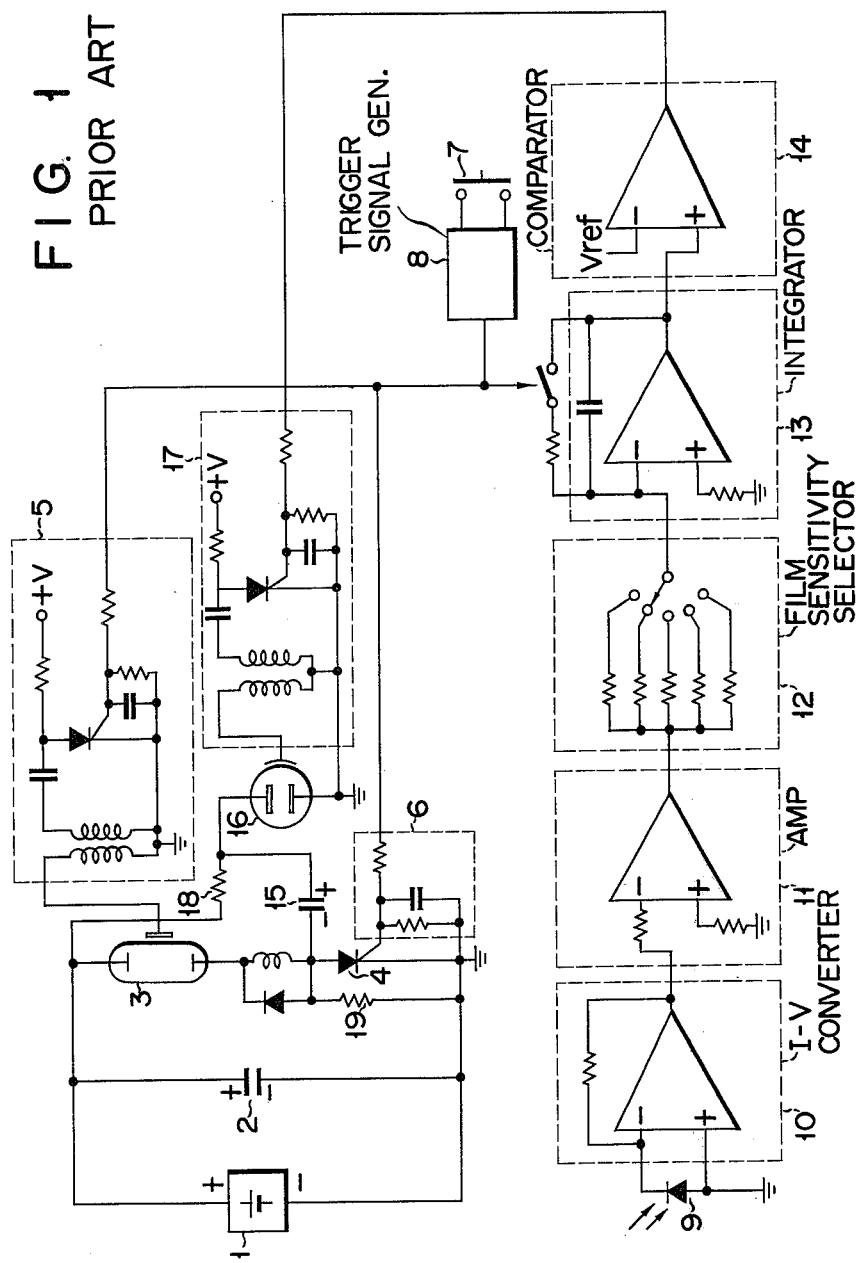
FIG. 1 is a circuit diagram of a conventional electronic flash apparatus.
Figure 2:
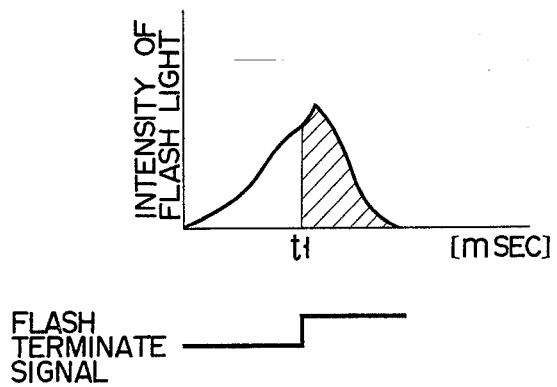
FIG. 2 is a diagram useful in explaining the drawback of the conventional flash apparatus.
Figure 3:
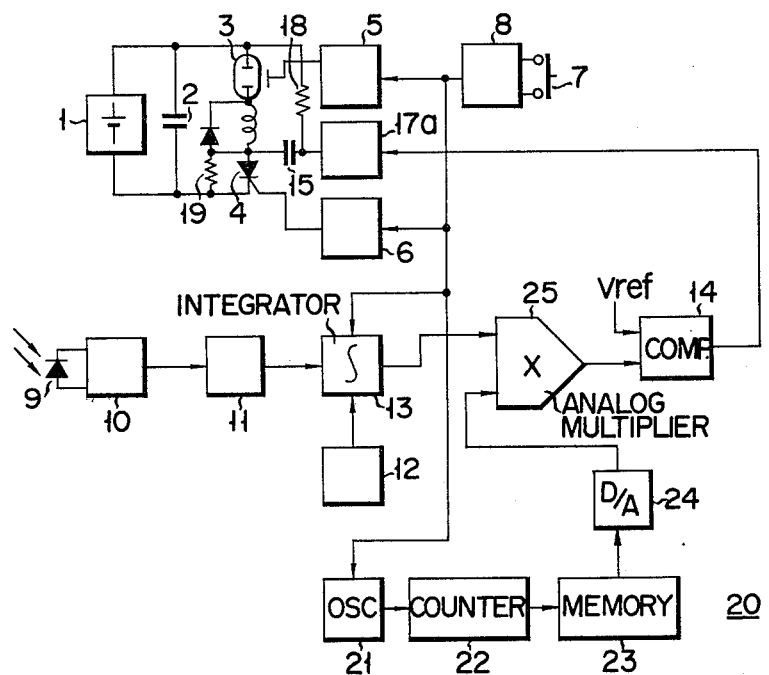
FIG. 3 is a block diagram of a first embodiment of an electronic flash apparatus according to the invention.
Figure 4:
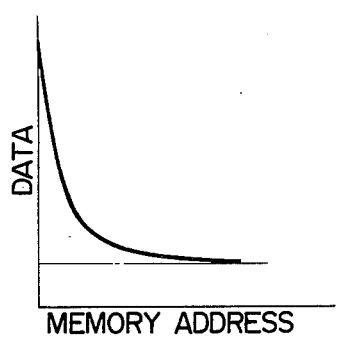
FIG. 4 is a diagram of digital data stored in a memory circuit used in FIG. 3.

The present invention will be described in detail referring to the accompanying drawings. Throughout the drawings, like reference numerals will be used for designating like or equivalent portions in FIG. 1 as mentioned already, for simplicity of illustration and explanation. As shown in FIG. 3 illustrating a first embodiment of an electronic flash apparatus according to the invention, a compensation signal generating circuit 20 is comprised of a clock signal generating circuit 21, a counter circuit 22, a memory circuit 23, and a digital-to-analog converter 24. In operation, the counter circuit 22 counts clock signals produced by the clock signal generating circuit 21 so that the count in the counter 22 is continuously changed. The count output of the counter circuit 22 is applied as address information to the memory circuit 23. Stored digital data as shown in FIG. 4 are sequentially read out from memory locations in the memory circuit 23 having addresses corresponding to the counts of the counter 22. The digital data read out is converted into an analog signal by the digital-to-analog converter 24. The analog signal has a desired waveshape corresponding to the digital data stored in the memory circuit 23 as shown in FIG. 4 and is used as a compensation signal.

Figure 5:
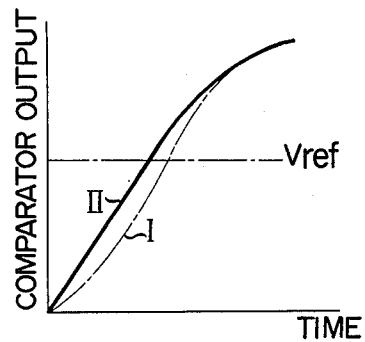
FIG. 5 is a waveform of an input signal from an integrator useful in explaining the operation of the embodiment shown in FIG. 3.

An analog multiplier 25 is provided between an integration circuit 13 and a comparing circuit 14 to multiply an output signal of the integration circuit 13 by the compensation signal. In other words, the output signal of the integration circuit 13 is amplitude-modulated by the compensation signal. A curve I in FIG. 5 indicates a waveform of the output signal of the integration circuit 13 and a curve II a waveform of the output signal of the multiplier 25. When the values of data stored in the memory circuit 23 are properly selected, it is possible that the output signal of the multiplier 25 more quickly reaches a reference level Vref than the output signal of the integration circuit 13. As a result, a flash terminate signal used for rendering a semiconductor switching element 4 nonconductive is produced by the comparing circuit 14, before an amount of the reflecting light from an object to be photographed reaches a given level and is applied to a flash terminate circuit 17a including a quenching tube and a trigger circuit.

In this embodiment, if a multiplier type digital-to-analog converter is used, there is no need for providing separately the digital-to-analog converter 24 and the multiplier 25 as shown. The use of an erasable memory, called EPROM, for the memory circuit ensures a very accurate compensation by merely rewriting, the contents of the memory even when a flash discharge lamp is exchanged by a new one. For a usual use, it is only required that compensation signal data adjusted for a typical discharge tube be stored in the ROM or PROM.

Figure 6:
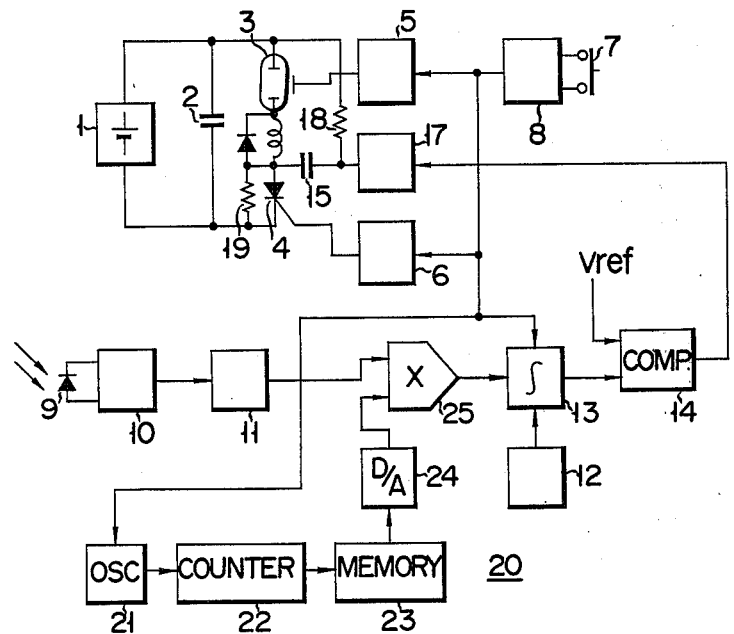
FIG. 6 is a block diagram of a second embodiment of the invention.

Turning now to FIG. 6, there is shown a second embodiment of the electronic flash apparatus according to the invention in which the multiplier 25 is provided at the input side of the integration circuit 13. The amplitude-modulation of an electric signal corresponding to the reflected light from the object, which is applied to the integration circuit 13, by the compensation signal may also modify an electric signal applied to the comparator 14 so as to have a waveshape as indicated by the curve II in FIG. 5.

Figure 7:
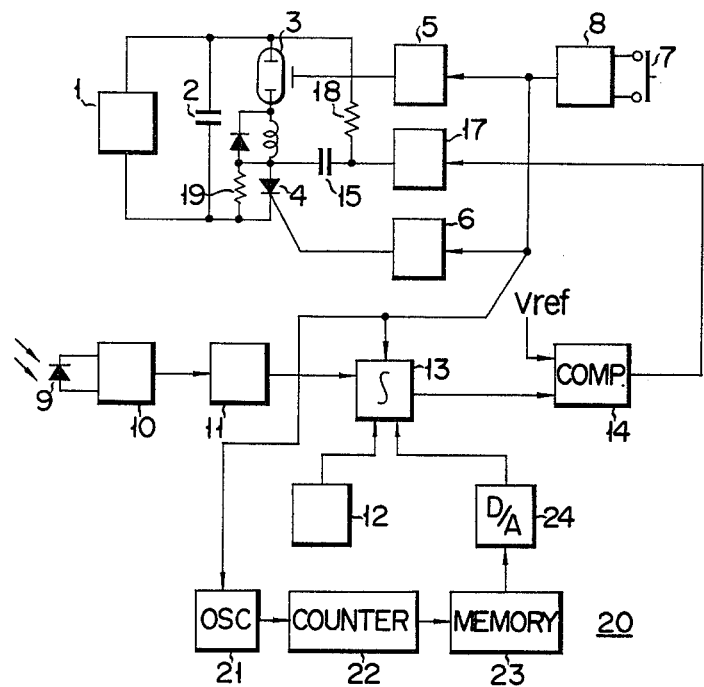
FIG. 7 is a block diagram of a third embodiment of the invention.
Figure 8:
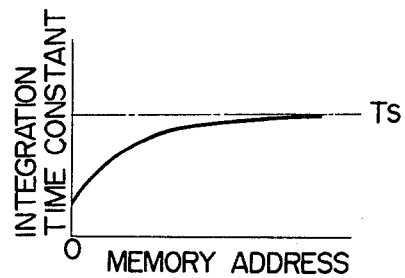
FIG. 8 is a graphical expression of digital data stored in a memory circuit based in the embodiment shown in FIG. 7.

FIG. 7 shows a third embodiment of the flash apparatus of the invention in which an integration time constant of the integration circuit 13 is changed in accordance with the waveshape of the output signal of the digital-to-analog converter 24, or the compensation signal. Changing the time constant of the integration circuit 13 in accordance with the waveshape of the correction signal may have the same effect as that resulting from the amplitude control of the output signal of the integration circuit by the compensation signal. Namely, the same effect as that of the above-mentioned embodiment will be obtained when the compensation signal having a waveshape as shown in FIG. 8, for example, changes the integration time constant of integration 13 in accordance with its waveshape. As the means for changing the integration time constant, use may be made of a variable impedance element such as an FET or a variable capacitance diode.

Figure 9:
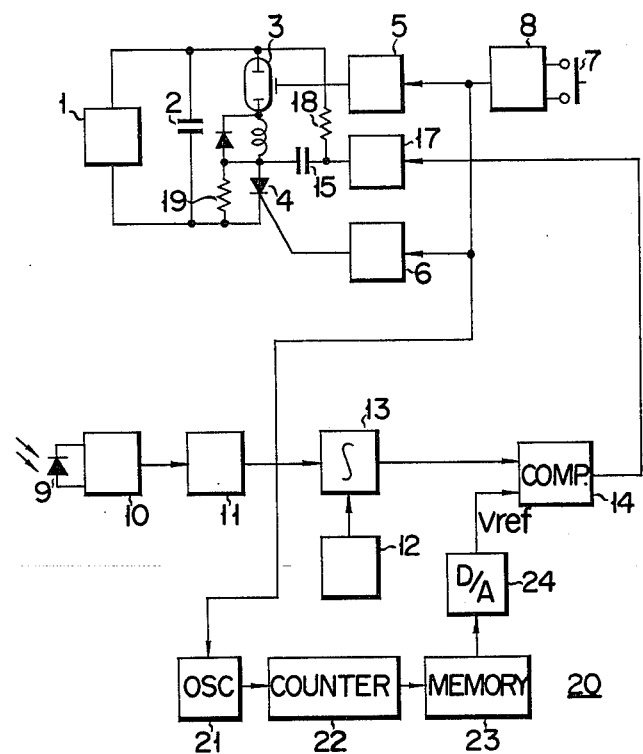
FIG. 9 is a block diagram of a fourth embodiment of the invention.
Figure 10:
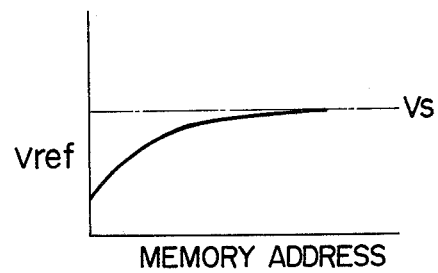
FIG. 10 is a graphical expression of digital data stored in a memory circuit used in the embodiment in FIG. 9.

A fourth embodiment of the invention is shown in FIG. 9 which employs the compensation signal as the reference voltage Vref of the comparing circuit 14. Changing the reference voltage Vref according to the waveshape of the compensation signal as shown in FIG. 10 enables the output voltage level of the integration circuit 13 to exceed the reference voltage to produce a flash terminate signal before the reference voltage Vref reaches a given level Vs.

Figure 11:
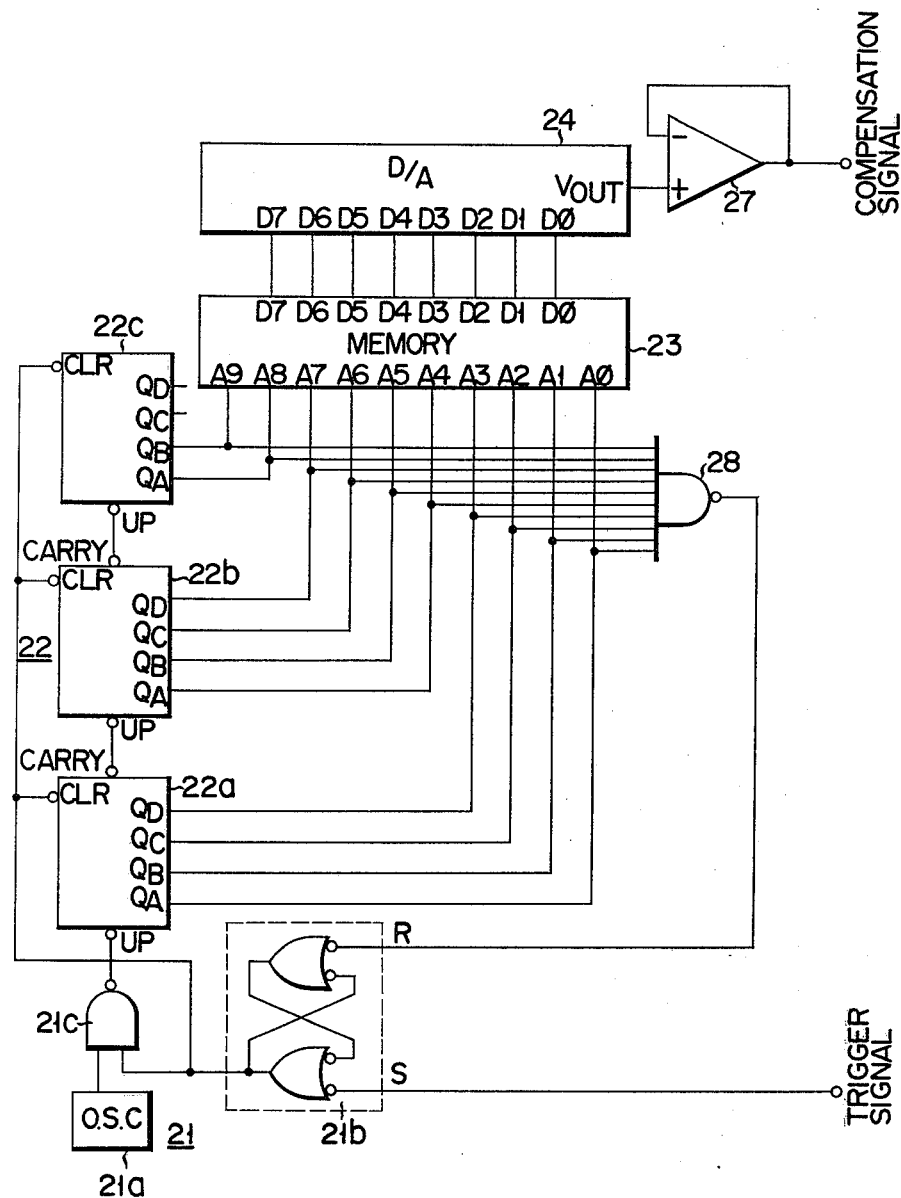
FIG. 11 is a practical circuit diagram of the compensation signal generating circuit used in the above-mentioned embodiments of the invention.
Figure 12:
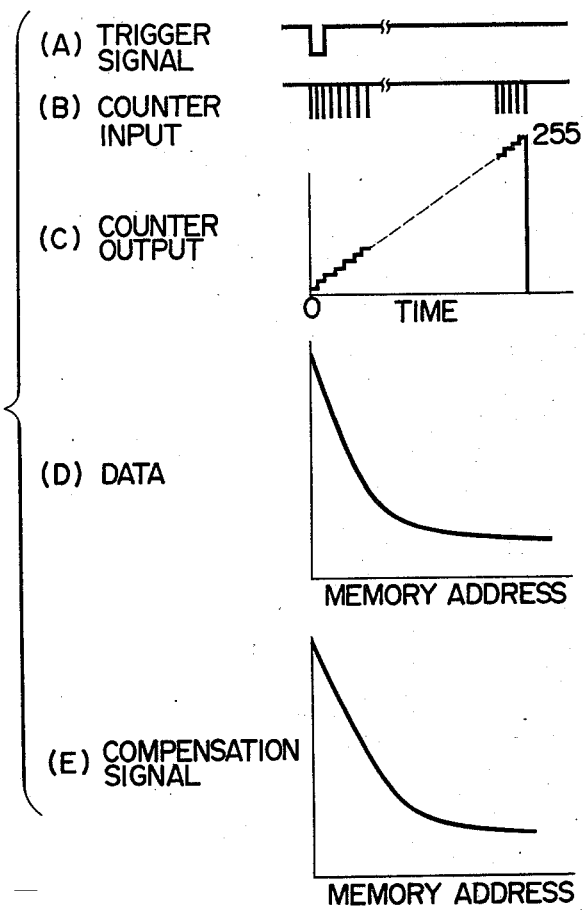
FIG. 12 is a diagram useful in explaining the operation of the compensation signal generating circuit shown in FIG. 11.

Referring now to FIG. 11 there will be described a practical circuit arrangement of the compensation signal generating circuit 20 used in each of the above-mentioned embodiments. In the circuit arrangement, the clock signal generating circuit 21 includes an oscillator 21a, a flip-flop circuit 21b, and a NAND gate 21c. In operation, a flash initiate signal or trigger signal (FIG. 12A) sets the flip-flop circuit 21b to enable the NAND gate 21c, with the result that clock pulses (FIG. 12B) from the oscillator 21a are applied to the counter 22. The counter circuit 22 is comprised of 4-bit counters 22a, 22b and 22c such as SN74192 manufactured by Texas Instruments Incorporated. Upon receipt of the clock pulse, the count of the counter circuit 22 continuously changes as shown in FIG. 12C. The 10-bit outputs from the counter circuit 22 are coupled with the address terminals of the memory circuit 23 such as Intel 8708 PROM of 8 bits×1024 words. The memory locations are sequentially accessed from $\phi$ address to read out the digital data stored, as shown in FIG. 12D. The digital output from the memory circuit 23 is inputted into a digital-to-analog converter 24 such as Teledyne Semiconductor 4021 thereby to obtain an analog signal as shown in FIG. 12E, which corresponds to the digital data stored in the memory. The output signal of the digital-to-analog converter 24, after passing through a buffer amplifier 27, is used for the compensation signal. A NAND gate 28 is provided to reset the flip-flop circuit 21b so as to disable the NAND gate 21c and clear the counters 22a, 22b, and 22c when the counter circuit 22 has a given value. The digital compensation signal generating means employed in the embodiment may be replaced by an analog compensation signal generating circuit such as a triangle wave generating circuit. The counter circuit 22 may be realized by using a program of a microprocessor, for example. In this case, the memory circuit 23 may be used as a memory for storing the program for the microprocessor. This is very economical from a view of hardware. Instead of directly applying the digital output of the memory 23 to the digital-to-analog converter 24, the output data of the memory circuit 23 may be written into an accumulator of the microprocessor and then applied through output port to the digital-to-analog converting circuit 24. It should be noted that the waveforms shown in FIGS. 4, 5, 8 and 10, and in FIGS. 12(D) and (E) are not depicted stepwisely, unlike that of FIG. 12(C), for ease of understanding of the figures. Analog signals having the waveforms as shown in FIGS. 4, 5, 8 and 10, and FIGS. 12(D) and (E) may easily be obtained by inputting the stepwise compensation signal digitally produced into a simple integrator.

The description has hitherto been made about the correction of the exposure error due to the discharge current of the commutating capacitor in the case where thyristor is used as the semiconductor switching element. Also in case where a GTO (gate turn off) thyristor or a transistor with no need for the commutating capacitor is used for the semiconductor switching element, or when a by-pass circuit discharges the main capacitor to terminate the flash of the flash discharge lamp i.e. a by-pass control method, excessive exposure may arise during close distance photographing, as in the above case, when the light sensing element 19, the current-to-voltage converting circuit 10, the amplifier 11, and the like have poor frequency response.

More specifically, since the waveform of a signal applied to the integration circuit 13 has a time lag, compared to the waveform of flash light, an excessive amount of flash light has been produced before the output signal of the integrator 13 reaches a given value to cause the flash terminate signal to be generated and to terminate the flash of the lamp, resulting in the excessive exposure. The excessive exposure is more distinguished as the flashing time of the flash lamp is shorter. The flash control system of this invention is very effectively used in such a case.

In another application of the present invention, the exposure may be freely adjusted by properly selecting the waveshape of the compensation signal in a manner that a slight overexposure is obtained for long distance photographing and a slight underexposure for close distance photographing. This is a feature never found in the conventional device of this type.

The use of the flash control system of the invention as described above may provide proper exposure even in close distance photographing in which the conventional device unavoidably experiences excessive exposure. As a result, a distance between a camera and an object which enables automatic flash photographing is extended. Accordingly, if the flash control system of the invention is applied to an endoscope strobo apparatus, an accurate endoscope inspection is secured. In this field, close distance photographing of a morbid portion, which is made for the purpose of enlarging the morbid portion, very frequently experiences excessive exposure. The application of the flash control system of the invention can completely eliminate such an excessive exposure. According to this invention, since an optimum exposure is obtained by flash light caused by discharge current of the commutating capacitor, the useless consumption of charge in the main capacitor can be avoided, elongating the battery life. The present invention further enables successive flash photographing at a fast rate and thus shortens the endoscope inspection time.

What is claimed is:

1. An electronic flash apparatus comprising:
   a capacitor;
   a flash lamp and a semiconductor switching element connected in series across said capacitor;
   trigger circuit means response to application of a trigger signal thereto to trigger said flash lamp and render said semiconductor switching element conductive, to thereby discharge said capacitor and to cause said flash lamp to produce a flash light toward an object to be photographed;
   flash control circuit means coupled to said semiconductor switching element and responsive to receipt of light reflected from said object to produce a flash control signal for rendering said semiconductor switching element nonconductive when an amount of the light reflected from the object reaches a given level, said flash control circuit means including photoelectric converting means for converting the light reflected from the object into an electrical signal; an integration circuit for integrating the electrical signal from said photoelectric converting means, the magnitude of the output signal of said integration circuit gradually increasing at an integration time constant; and a comparing circuit having an input coupled to the output of said integration circuit and another input having a reference comparison level signal coupled thereto;
   a compensation signal generating circuit means responsive to application of the trigger signal thereto to produce a compensation signal with a waveshape independent of the electrical signal from said photoelectric converting means; and an analog multiplier forming a part of said flash control circuit means and connected between said integration circuit and said comparing circuit for multiplying the output signal of said integration circuit by the compensation signal, said comparing circuit comparing the output of said analog multiplier with said reference comparison level signal such that when the magnitude of the output of said analog multiplier exceeds the reference level, said flash control circuit means produces said flash control signal.

2. An electronic flash apparatus comprising:

a capacitor;

a flash lamp and a semiconductor switching element connected in series across said capacitor;

trigger circuit means responsive to application of a trigger signal thereto to trigger said flash lamp and render said semiconductor switching element conductive, to thereby discharge said capacitor and to cause said flash lamp to produce a flash light toward an object to be photographed;

flash control circuit means coupled to said semiconductor switching element and responsive to receipt of light reflected from said object to produce a flash control signal for rendering said semiconductor switching element nonconducting when an amount of the light reflected from the object reaches a given level, said flash control circuit means including photoelectric converting means for converting the light reflected from the object into an electrical signal; an integration circuit for integrating at least the electrical signal from said photoelectric converting means, the magnitude of the output signal of said integration circuit gradually increasing at an integration time constant; and a comparing circuit for comparing the magnitude of the output signal from said integration circuit with a reference comparison level so that, when the magnitude of the output signal of said integration circuit exceeds the reference comparison level, said flash control circuit means produces the flash control signal;

a compensation signal generating circuit means responsive to application of the trigger signal thereto to produce a compensation signal with a waveshape independent of the electrical signal from said photoelectric converting means; and an analog multiplier forming a part of said flash control circuit means and connected between said photoelectric converting means and said integration circuit for multiplying the electrical signal from said photoelectric converting means by the compensation signal, the multiplied signal being integrated by said integration circuit.

3. An electronic flash apparatus comprising:

a capacitor;

a flash lamp and a semiconductor switching element connected in series across said capacitor;

trigger circuit means responsive to application of a trigger signal thereto to trigger said flash lamp and render said semiconductor switching element conductive, to thereby discharge said capacitor and to cause said flash lamp to produce a flash light toward an object to be photaraphed;

flash control circuit means coupled to said semiconductor switching element and responsive to receipt of light reflected from said object to produce a flash control signal for rendering said semiconductor switching element nonconductive when an amount of the light reflected from the object reaches a given level, said flash control circuit means including photoelectric converting means for converting the light reflected from the object into an electrical signal; an integration circuit for integrating the electrical signal from said photoelectric converting means, the magnitude of the output signal of said integration circuit gradually increasing at an integration time constant; and a comparing circuit for comparing the magnitude of the output signal from said integration circuit with a reference comparison level so that, when the magnitude of the output signal of said integration circuit exceeds the reference comparison level, said flash control circuit means produces the flash control signal;

a compensation signal generating circuit means responsive to application of the trigger signal thereto to produce a compensation signal with a waveshape independent of the electrical signal from said photoelectric converting means, said compensation signal generating circuit means being coupled to said integration circuit for changing the integration time constant of said integration circuit as a function of the waveshape of said compensation signal.

4. An electronic flash apparatus comprising:

a capacitor;

a flash lamp and a semiconductor switching element connected in series across said capacitor;

trigger circuit means responsive to application of a trigger signal thereto to trigger said flash lamp and render said semiconductor switching element conductive, to thereby discharge said capacitor and to cause said flash lamp to produce a flash light toward an object to be photographed;

flash control circuit means coupled to said semiconductor switching element and responsive to receipt of light reflected from said object to produce a flash control signal for rendering said semiconductor switching element nonconductive when an amount of the light reflected from the object reaches a given level, said flash control circuit means including photoelectric converting means for converting the light reflected from the object into an electrical signal; an integration circuit for integrating the electrical signal from said photoelectric converting means, the magnitude of the output signal of said integration circuit gradually increasing at an integration time constant; and a comparing circuit for comparing the magnitude of the output signal from said integration circuit with a reference comparison level so that, when the magnitude of the output signal of said integration circuit exceeds the reference comparison level, said flash control circuit means produces the flash control signal;

a compensation signal generating circuit means responsive to application of the trigger signal thereto to produce a compensation signal with a waveshape independent of the electrical signal from said photoelectric converting means, said compensation signal generating circuit means being coupled to said comparing circuit so as to change the reference comparison level as a function of the waveshape of said compensation signal.

5. The electronic flash apparatus of claim 4, wherein said compensation signal generating circuit means supplies a signal defining a reference comparison level to said comparing circuit.

6. The electronic flash apparatus of any one of claim 1, 2, 3, 4 or 5, wherein said compensation signal generating circuit means comprises:
   clock pulse generating means;
   counter circuit means for counting clock pulses from said clock pulse generating means;
   memory means coupled to receive the count of said counter circuit means as an address signal and to read out a digital signal from a memory location designated by said address signal; and
   digital-to-analog converting means for converting the digital signal read out from said memory means into an analog compensation signal.

* * * * *

UNITED STATES PATENT AND TRADEMARK OFFICE
CERTIFICATE OF CORRECTION

PATENT NO. : 4,329,623
DATED : May 11, 1982
INVENTOR(S) : Shinichiro HATTORI

It is certified that error appears in the above—identified patent and that said Letters Patent is hereby corrected as shown below:

COLUMN 1, line 53, after "capacitor" change "15a to connec-"

to --15 to a connec- --.

Signed and Sealed this

Twenty-fourth Day of August 1982

[SEAL]

Attest:

GERALD J. MOSSINGHOFF

Attesting Officer       Commissioner of Patents and Trademarks